(12) United States Patent
Guldenfels

(10) Patent No.: US 6,357,581 B1
(45) Date of Patent: Mar. 19, 2002

(54) MODULAR RADIUS CONVEYOR BELT

(75) Inventor: Dieter Guldenfels, Pfeffingen (CH)

(73) Assignee: Habasit AG, Reinach (CH)

( * ) Notice: Subject to any disclaimer, the term of this patent is extended or adjusted under 35 U.S.C. 154(b) by 0 days.

(21) Appl. No.: 09/619,151

(22) Filed: Jul. 19, 2000

(51) Int. Cl.$^7$ .............................................. B65G 17/06
(52) U.S. Cl. ...................... 198/853; 198/850; 198/852
(58) Field of Search ............................. 198/853, 850, 198/852

(56) References Cited

U.S. PATENT DOCUMENTS

| | | | |
|---|---|---|---|
| 3,768,631 A | 10/1973 | Wahren | 198/189 |
| 4,394,901 A | 7/1983 | Roinestad | 198/850 |
| 4,557,374 A | 12/1985 | Bode | 198/852 |
| D282,907 S | 3/1986 | Schroeder et al. | D8/499 |
| D286,136 S | 10/1986 | Schroeder et al. | D8/499 |
| 4,742,907 A | 5/1988 | Palmaer | 198/831 |
| 4,754,872 A | 7/1988 | Damkjaer | 198/852 |
| 4,858,753 A | 8/1989 | Hodlewsky | 198/853 |
| 4,893,710 A | 1/1990 | Bailey et al. | 198/853 |
| 4,901,844 A | 2/1990 | Palmaer et al. | 198/778 |
| D307,707 S | 5/1990 | Abbestam et al. | D8/499 |

(List continued on next page.)

FOREIGN PATENT DOCUMENTS

| | | | |
|---|---|---|---|
| EP | 0521506 | 7/1992 | B65G/17/08 |
| EP | 0567337 | 4/1993 | B65G/17/08 |
| EP | 0739830 | 4/1993 | B65G/17/08 |
| WO | 9505986 | 3/1995 | B65G/17/06 |

Primary Examiner—Christopher P. Ellis
Assistant Examiner—Khoi H. Tran
(74) Attorney, Agent, or Firm—Hodgson Russ LLP

(57) ABSTRACT

A modular radius conveyor belt formed of rows of belt modules pivotally interlinked by transverse pivot rods and specially adapted for following a curved conveyor path. The modules include a top, product conveying surface and a bottom, sprocket-driven surface. The belt modules have a plurality of first link ends disposed in the direction of travel of the conveyor belt and a plurality of second link ends disposed in the opposite direction. Transverse holes in the link ends are aligned to accommodate a pivot rod. When the link ends of the consecutive rows of side by side modules are intercalated, the pivot rod serves as a hinge pin in a hinged joint between consecutive interlinked rows. To permit the belt to flex side-wise, the openings in the first link ends are slotted longitudinally in the direction of belt travel. The link ends have leg portions with differing widths. The link ends having the transverse slots are wider than the link ends having the transverse openings such that the cross-sectional areas of the leg portions are approximately equal.

27 Claims, 4 Drawing Sheets

U.S. PATENT DOCUMENTS

| | | | |
|---|---|---|---|
| 4,934,517 A | 6/1990 | Lapeyre | 198/852 |
| 4,949,838 A | 8/1990 | Lapeyre et al. | 198/853 |
| 4,972,942 A | 11/1990 | Faulkner | 198/853 |
| 4,989,723 A | 2/1991 | Bode et al. | 198/635 |
| 4,993,544 A | 2/1991 | Bailey et al. | 198/834 |
| 5,031,757 A | 7/1991 | Draebel et al. | 198/852 |
| 5,065,860 A | 11/1991 | Faulkner | 198/848 |
| 5,069,330 A | 12/1991 | Palmaer et al. | 198/778 |
| 5,083,659 A | 1/1992 | Bode et al. | 198/853 |
| 5,105,938 A | 4/1992 | Tan | 198/853 |
| 5,133,449 A | 7/1992 | Spangler | 198/778 |
| 5,139,135 A | 8/1992 | Irwin et al. | 198/852 |
| 5,156,264 A | 10/1992 | Lapeyre | 198/852 |
| 5,181,601 A | 1/1993 | Palmaer et al. | 198/831 |
| 5,217,110 A | 6/1993 | Spangler et al. | 198/852 |
| 5,224,583 A | 7/1993 | Palmaer et al. | 198/779 |
| 5,271,491 A | 12/1993 | Irwin | 198/778 |
| 5,280,833 A | 1/1994 | Robin | 198/831 |
| 5,303,818 A | 4/1994 | Gruettner et al. | 198/850 |
| 5,310,045 A | 5/1994 | Palmaer et al. | 198/778 |
| 5,310,046 A | 5/1994 | Palmaer et al. | 198/831 |
| 5,332,084 A | 7/1994 | Greve | 198/853 |
| 5,372,248 A | 12/1994 | Horton | 198/852 |
| 5,419,428 A | 5/1995 | Palmaer et al. | 198/831 |
| 5,425,443 A | 6/1995 | van Zijderveld et al. | 198/834 |
| 5,431,275 A | 7/1995 | Faulkner | 198/853 |
| 5,439,099 A | 8/1995 | Bos et al. | 198/853 |
| 5,547,071 A | 8/1996 | Palmaer et al. | 198/853 |
| 5,562,200 A | 10/1996 | Daringer | 198/844.2 |
| 5,566,817 A | 10/1996 | Meeker | 198/848 |
| 5,573,105 A | 11/1996 | Palmaer | 198/853 |
| 5,613,597 A | 3/1997 | Palmaer et al. | 198/853 |
| 5,628,393 A | 5/1997 | Steeber et al. | 198/699.1 |
| 5,645,160 A | 7/1997 | Palmaer et al. | 198/853 |
| 5,690,210 A | 11/1997 | Layne | 198/853 |
| 5,738,205 A | 4/1998 | Draebel | 198/852 |
| 5,906,270 A | 5/1999 | Faulkner | 198/853 |
| 5,911,305 A | 6/1999 | Layne | 198/832 |
| 5,921,379 A | 7/1999 | Horton | 198/852 |
| 6,079,543 A * | 6/2000 | Palmaer | 198/853 |
| 6,241,080 B1 * | 6/2001 | Tuomikoski | 198/853 |

* cited by examiner

MODULAR RADIUS CONVEYOR BELT

FIELD OF INVENTION

This invention relates to conveyor belts and, more particularly, to modular plastic conveyor belts formed of rows of plastic belt modules pivotally interlinked by transverse pivot rods.

BACKGROUND OF THE INVENTION

Because they do not corrode, are light weight, and are easy to clean, unlike metal conveyor belts, plastic conveyor belts are used widely, especially in conveying food products. Modular plastic conveyor belts are made up of molded plastic modular links, or belt modules, that can be arranged side by side in rows of selectable width. A series of spaced apart link ends extending from each side of the modules include aligned apertures to accommodate a pivot rod. The link ends along one end of a row of modules are interconnected with the link ends of an adjacent row. A pivot rod journaled in the aligned apertures of the side-by-side and end-to-end connected modules forms a hinge between adjacent rows. Rows of belt modules are then connected together to form an endless conveyor belt capable of articulating about a drive sprocket.

In many industrial applications, conveyor belts are used to carry products along paths including curved segments. Belts capable of flexing side-wise to follow curved paths are referred to as side-flexing, turn, or radius belts. As a radius belt negotiates a turn, the belt must be able to fan out because the edge of the belt at the outside of the turn follows a longer path than the edge at the inside of the turn. In order to fan out, a modular plastic radius belt typically has provisions that allow it to collapse at the inside of a turn or to spread out at the outside of the turn.

Apertures slotted in the direction of travel of the belt are commonly provided in the link ends on at least one side of the modules to facilitate the collapsing and spreading of the belt.

The requirement of following a curved path causes problems not found in straight-running belts. As one example, radius belts, especially if tightly tensioned or running fast and lightly loaded, tend to rise out of the conveyor support around a turn. As another example, because belt pull is concentrated in the outer portion of the belt as it rounds a turn, outer link ends are more likely to fail unless otherwise strengthened or bolstered.

There are other problems with some common belt designs. For example, stresses can be molded into the plastic modules during the manufacturing process. Sharp, as opposed to curved, junctions between molded features on a belt module are more likely to form concentrated stress regions. When such modules make up a conveyor belt, operation of the belt increases the stress in those regions. In a radius belt, in which the pulling load is unevenly distributed across the width of the belt as it rounds a turn, the problem is exacerbated. One way to solve the problem is to add more material to the belt, but that makes the belt heavier, increases the production cost due to the larger molding cycle and closes in some of the desirable open area that allows for drainage or air flow.

Another problem with some structures of radius belts is compression of the modules transverse to the direction of belt travel. A radius belt bricklayed to a width of, for example one meter, may compress by three to four millimeters as the belt rounds a turn, which can cause the belt to come out of the conveyor support. Belts having the corrugated configuration shown in U.S. Pat. No. 5,372,248 to Horton are especially susceptible to bending and compression of this type.

What is needed is a modular radius conveyor belt that is resistant to compression and that improves the strength of the belt.

SUMMARY OF THE INVENTION

The present invention meets the above-described need by providing an endless conveyor belt formed of plastic belt modules and capable of following a curved path. The modules include first and second module surfaces, i.e., a top, product-conveying surface and a bottom, sprocket-driven surface. An intermediate section extends across the width of each module transverse to the direction of belt travel. The intermediate section may be formed in part by a web and in part by a thin, corrugated strip having a pair of essentially parallel walls. The corrugated strip forms a series of regularly spaced alternating ridges and valleys along each wall. As an alternative the intermediate portion may be defined entirely by a corrugated strip or stiffening web, as described herein.

Link ends extend outward from the ridges on each wall of the corrugated strip. Each link end has a leg portion attached at a ridge of the strip and a thick distal portion at the end of the link end distant from the corrugated strip. Transverse holes in the link ends extending from respective walls of a module are aligned to accommodate a pivot rod. To permit the belt to follow a curved path, the pivot rod openings in at least one of the link ends extending from one of the walls of the intermediate section are slotted longitudinally in the direction of belt travel. When the link ends of consecutive rows of side-by-side modules are intercalated, the pivot rod serves as a hinge pin in a hinged joint between consecutive interlinked rows.

The leg portions of the respective link ends have different widths. The link ends having the transverse slots are wider than the link ends having the transverse openings such that the cross-sectional areas of the leg portions are approximately equal.

Each wall of the corrugated strip forms a series of arched recesses between the leg portions of the link ends. The recesses are large enough to provide room for a thick link end of an interlinked module of an adjacent row to collapse into the recess or to rotate as belt rows fan out going around a turn. Because the recesses along one wall overlap in a transverse direction with the recesses along the other wall, additional space for collapsing is provided.

BRIEF DESCRIPTION OF THE DRAWINGS

The invention is illustrated in the drawings in which like reference characters designate the same or similar parts throughout the figures of which.

DETAILED DESCRIPTION OF THE PREFERRED EMBODIMENTS

Figure 1:
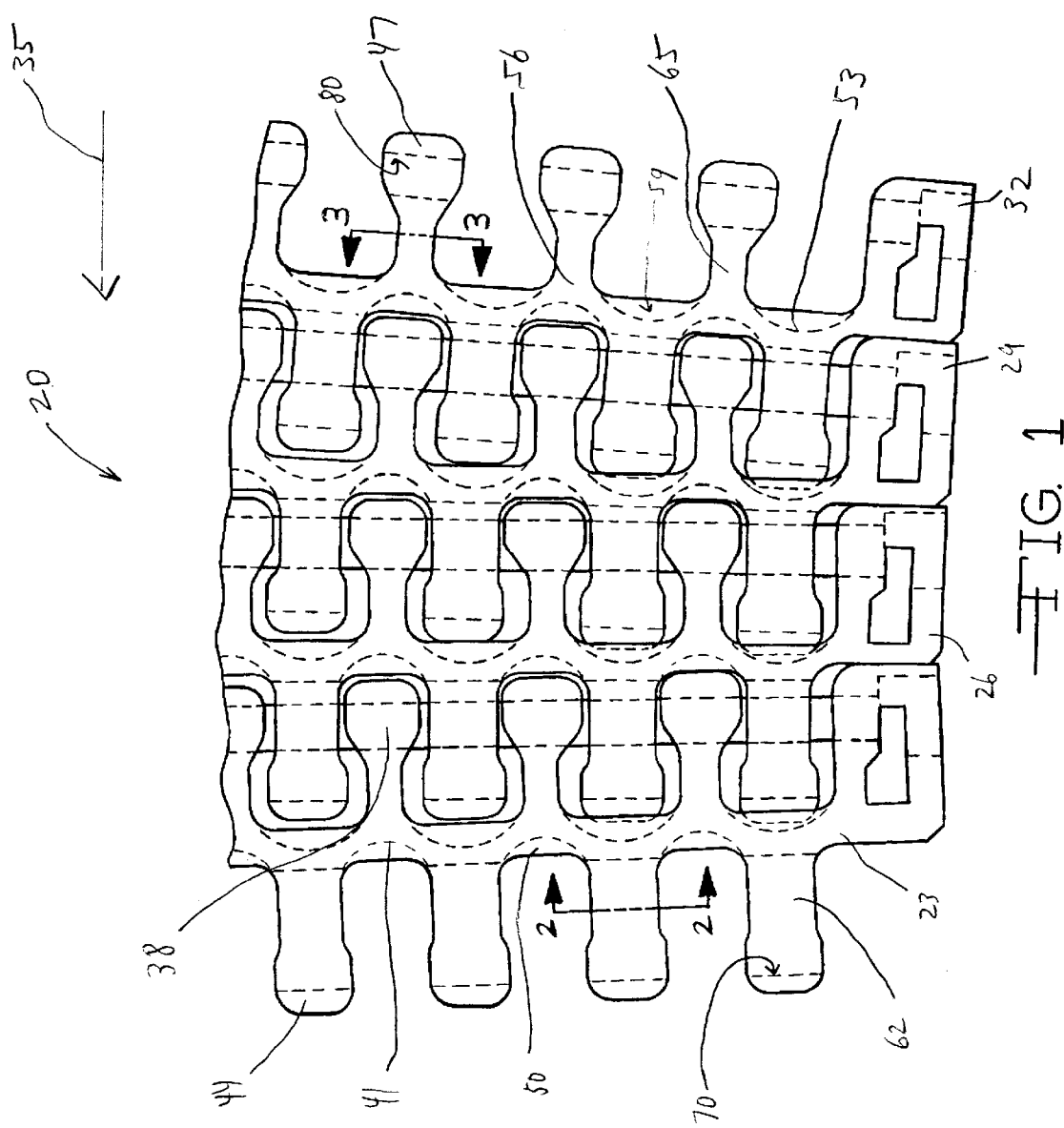
FIG. 1 is a top plan view of a radius conveyor belt of the present invention.

Referring generally to drawing FIGS. 1 to 4 and initially to FIG. 1, a first embodiment of a portion of a modular belt 20 of the present invention is shown. The portion of the modular belt 20 shown is formed from molded plastic modules 23, 26 29, and 32. For reference, the direction of belt travel is indicated by arrow 35, however, the belt of the present invention may be conveyed in either direction. A pivot rod 38 shown in phantom lines connects adjacent belt modules by passing through openings in the modules disposed transverse to the direction of belt travel.

Figure 4:
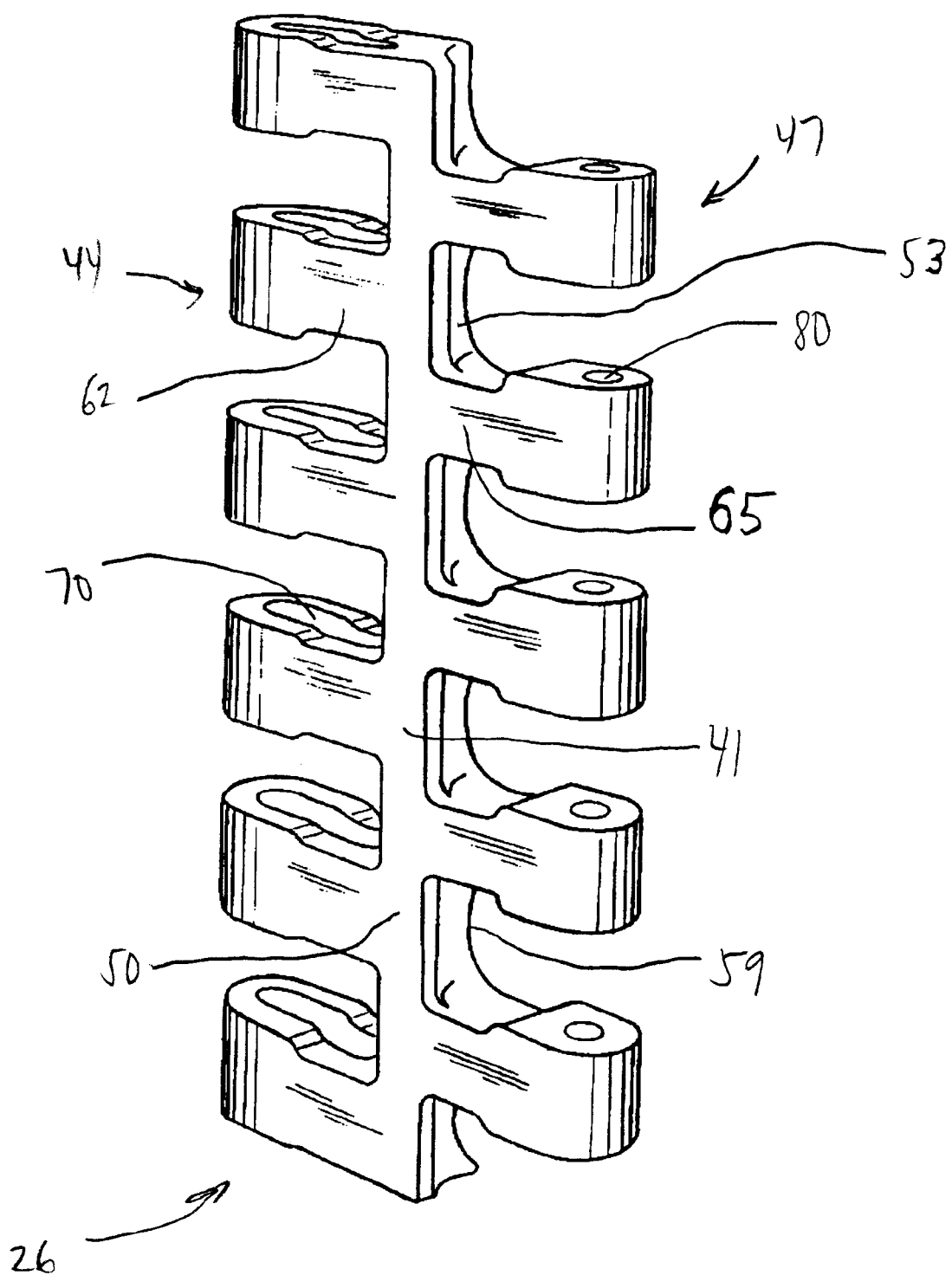
FIG. 4 is a top perspective view of a belt module of the present invention; and, FIG. 5 is a top perspective view of an alternate embodiment of the belt module of the present invention.
Figure 5:
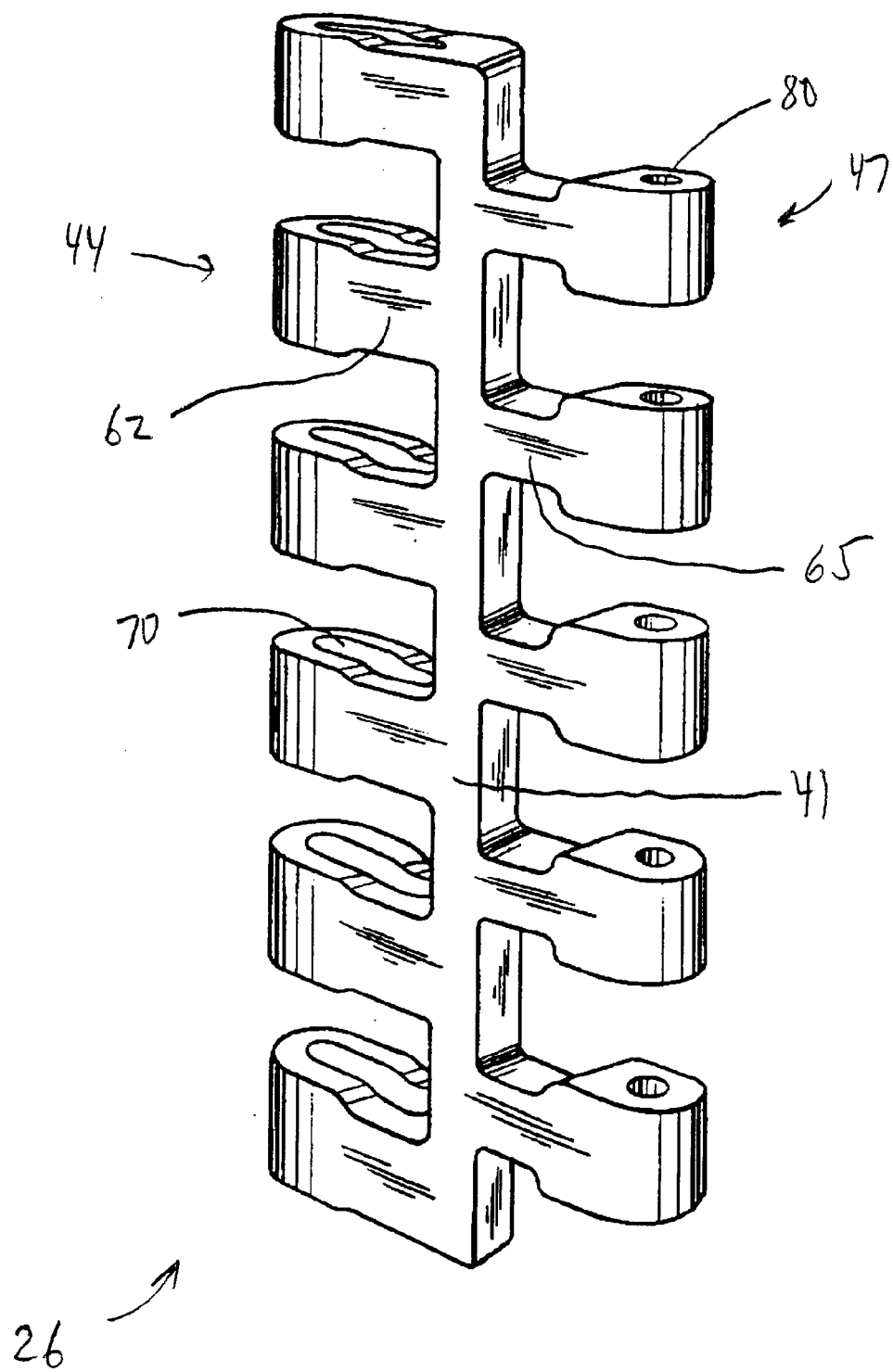

Each module has an intermediate section 41 supporting a plurality of first link ends 44 and a plurality of second link ends 47. The first link ends 44 are disposed in the direction of belt travel indicated by arrow 35 and the plurality of second link ends 47 extend opposite the first link ends 44. As shown in FIG. 4 and described in co-pending application Ser. No. 09/579,070, which is hereby incorporated by reference, the intermediate section 41 is comprised of an upper, transverse stiffening web 50 forming into a lower corrugated portion 53 shown in phantom lines in FIG. 1. The corrugated portion 53 forms a series of ridges 56 and valleys 59 in a sinusoidal manner. As an alternative, the intermediate section 41 may comprise a corrugated strip that extends from an upper product conveying surface to a bottom sprocket-driven surface, such as disclosed in U.S. Pat. No. 5,372,248 to Horton, which is hereby incorporated by reference. As a further alternative embodiment shown in FIG. 5, the intermediate section 41 may comprise a straight-walled stiffening web that extends from an upper product conveying surface to a bottom sprocket-driven surface. Another alternative for the intermediate section 41 is shown in FIGS. 5 and 6 of U.S. Pat. No. 3,870,141 to Lapeyre et al., which is incorporated herein by reference.

The link ends 44 are connected to the intermediate section 41 by leg portions 62. Similarly, link ends 47 are connected to the intermediate section 41 by leg portions 65. As shown, the leg portions 62 are significantly wider than leg portions 65 along a direction transverse to the direction of belt travel.

Figure 2:
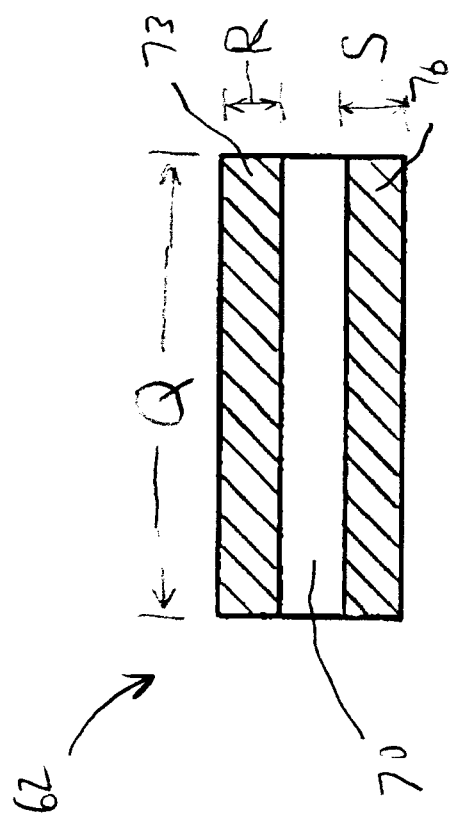
FIG. 2 is a cross-sectional view taken along lines 2—2 of FIG. 1.

In FIG. 2, the cross-section of leg portion 62 is shown. The cross-section reveals the transverse slot 70 which receives the pivot rod 38 and provides space for the fanning and collapsing of the belt 20 to accommodate a curved conveying path and which divides the leg portion 62 into an upper portion 73 and a lower portion 76. The cross-section of leg portion 62 has a length Q in the direction transverse to the belt direction. The upper portion 73 has an area defined by Q multiplied by R which is the width of the upper portion 73 above the slot 70. The lower portion 76 has an area defined by Q multiplied by S which is the width of the lower portion 76 below the slot 70. Accordingly, the cross-sectional area of the leg portion 62 is defined by the equation $((Q \times R)+(Q \times S))$. In FIG. 2, the height R is approximately equal to height S, however, R may be greater than or less than S. The dimensions of R and S may be varied while keeping the overall area of the cross-section approximately constant.

Figure 3:
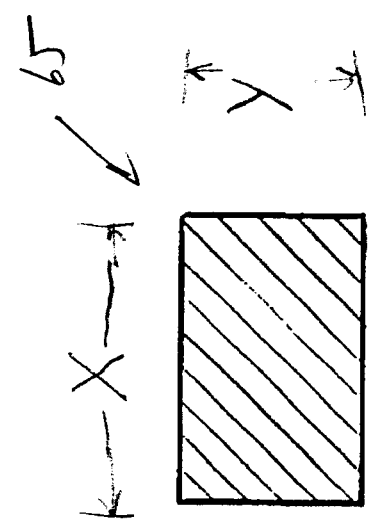
FIG. 3 is a cross-sectional view taken along lines 3—3 of FIG. 1.

In FIG. 3, the cross-section of leg portion 65 is solid because the transverse opening 80 (FIG. 1) for the pivot rod 38 is confined to the head portion of link end 47 and does not extend into leg portion 65. The cross-section has a length X and a width Y.

The leg portion 62 is wider than the leg portion 65 in order to compensate for the area that is removed from the leg portion 62 to form the transverse slot 70. Accordingly, the additional width of leg portion 62 results in the cross-sectional areas of leg portions 62, 65 preferably being approximately equal (i.e., $((Q \times R)+(Q \times S))=(X \times Y)$. The ratio between the two cross-sectional areas for leg portions 62 and 65 is preferably in the range of 0.8 to 1.2. A most preferred ratio is when the ratio of the cross-sectional areas for leg portions 62 and 65 is 1:1. The approximately equal cross-sectional areas of leg portions 62, 65 provide for approximately equal strength for the support of the link ends 44 and 47. The equal strength is desirable in order to ensure performance of the radius belt 20 around the tightest curves where the stresses on the belt 20 are most significant.

While the invention has been described in connection with certain preferred embodiments, it is not intended to limit the scope of the invention to the particular forms set forth, but, on the contrary, it is intended to cover such alternatives, modifications, and equivalents as may be included within the spirit and scope of the invention as defined by the appended claims.

What is claimed is:

1. A belt module, which comprises:
   a) an intermediate section;
   b) a first plurality of link ends each having a first head portion and a first leg portion and extending outwardly in the direction of travel from the intermediate section, the first link ends having a slot disposed there through, the slot being elongated along an axis of the first link end;
   c) a second plurality of link ends having a second head portion and a second leg portion and extending outwardly from the intermediate section in a direction opposite the first link ends, wherein a transverse opening is provided in each of the second link ends;
   d) wherein the first leg portions are wider than the second leg portions such that a ratio of a first cross-sectional area of the first leg portion to a second cross-sectional area of the second leg portion is in the range of 0.8 to 1.2.

2. The belt module of claim 1, wherein the ratio of the first cross-sectional area of the first leg portion to the second cross-sectional area of the second leg portion is approximately 1:1.

3. The belt module of claim 1, wherein the intermediate section comprises a corrugated strip disposed across the width of the module transverse to the direction of travel, the corrugated strip having opposed first and second walls forming a series of regular spaced ridges and grooves across the width of the module.

4. The belt module of claim 1, wherein the intermediate section is a transverse stiffening web.

5. The belt module of claim 1 wherein the intermediate section has a width and a thickness defined by an upper surface and a lower surface and wherein the intermediate section comprises a web portion extending across the width between the first and second walls from one of the upper and lower surfaces to a portion of the way though the thickness of the intermediate section to form into the corrugated strip extending across the width between the first and second walls to the other of the upper and lower surfaces.

6. The belt module of claim 1, wherein the head portions of the first and second plurality of link ends are wider than the respective first and second leg portions.

7. The belt module of claim 6, wherein the head portions of the first and second link ends have a pair of substantially parallel side walls and an end wall.

8. The belt module of claim 1, wherein the slot resides in the first head portion and the first leg portion of the first plurality of link ends.

9. The belt module of claim 1, wherein the transverse opening resides in the head portion of the second plurality of link ends.

10. The belt module of claim 1, wherein the cross-section of the first leg portion is defined by two sections, the first section having a length Q and a width R, the second section having a length Q and a width S.

11. The belt module of claim 10, wherein R is greater than S.

12. The belt module of claim 10, wherein R is less than S.

13. The belt module of claim 10, wherein R is approximately equal to S.

14. A radius conveyor belt, comprising:

a plurality of belt modules having a plurality of first link ends disposed in the direction of belt travel and having a plurality of second link ends disposed in the opposite direction, the first link ends having first head portions and first leg portions, the first link ends having a slot disposed there through, the slot being elongated along an axis of the first link end, the second link ends having a second head portion and a second leg portion, the plurality of second link ends having a transverse opening defined therein; an intermediate section disposed between the first and second link ends, the first and second link ends disposed such that a space capable of receiving a link end is formed between adjacent link ends, the space being open at one end and defined by the intermediate section at the opposite end, the plurality of first link ends being offset from the plurality of second link ends such that the first link ends align with the space between the second link ends such that adjacently positioned belt modules are capable of intercalating so that the first link ends of one belt module fit into the spaces defined between the second link ends of an adjacent belt module;

wherein the first leg portions are wider than the second leg portions such that the ratio of a first cross-sectional area of the first leg portions to a second cross-sectional area of the second leg portions is in the range of 0.8 to 1.2; and, a pivot rod extending transverse to the direction of belt travel through the openings in the second link ends of one of the plurality of belt modules and extending through the slots in the first link ends of an adjacent belt module such that the first and second link ends of the adjacent belt modules are intercalated and the adjacent belt modules are interlinked into adjacent hinged rows capable of following a curved path.

15. The radius conveyor belt of claim 14, wherein the ratio of the first cross-sectional area of the first leg portion to the second cross-sectional area of the second leg portion is approximately 1:1.

16. The radius conveyor belt of claim 14, wherein the intermediate section comprises a corrugated strip disposed across the width of the module transverse to the direction of travel, the corrugated strip having opposed first and second walls forming a series of regularly spaced ridges and grooves across the width of the module.

17. The radius conveyor belt of claim 14, wherein the intermediate section comprises a transverse stiffening member.

18. The radius conveyor belt of claim 14, wherein the intermediate section has a width and a thickness defined by an upper surface and a lower surface and wherein the intermediate section comprises a web portion extending across the width between the first and second walls from one of the upper and lower surfaces to a portion of the way though the thickness of the intermediate section to form into the corrugated strip extending across the width between the first and second walls to the other of the upper and lower surfaces.

19. The radius conveyor belt of claim 14, wherein the head portions of each of the first and second link ends are wider than the respective first and second leg portions.

20. The radius conveyor belt of claim 14, wherein the head portions of the first and second link ends have a pair of substantially parallel sidewalls and an end wall.

21. The radius conveyor belt of claim 14, wherein the slot resides in the first head portion and the first leg portion of the first plurality of link ends.

22. The belt module of claim 14, wherein the transverse opening resides in the head portion of the second plurality of link ends.

23. The belt module of claim 14, wherein the cross-section of the first leg portion is defined by two sections, the first section having a length Q and a width R, the second section having a length Q and a width S.

24. The belt module of claim 23, wherein R is greater than S.

25. The belt module of claim 23, wherein R is less than S.

26. The belt module of claim 23, wherein R is approximately equal to S.

27. A method of configuring a radius conveyor belt, comprising:

providing a plurality of belt modules having a plurality of first link ends disposed in the direction of belt travel and having a plurality of second link ends disposed in the opposite direction, the first link ends having first head portions and first leg portions, the first link ends having a slot disposed there through, the slot being elongated along an axis of the first link end, the second link ends having a second head portion and a second leg portion, the plurality of second link ends having a transverse opening therein; an intermediate section disposed between the first and second link ends, the first and second link ends disposed such that a space capable of receiving a link end is formed between adjacent link ends, the space being open at one end and defined by the intermediate section at the opposite end, the plurality of first link ends being offset from the plurality of second link ends such that the first link ends align with the space between the second link ends such that adjacently positioned belt modules are capable of intercalating so that the first link ends of one belt module fit into the spaces defined between the second link ends of an adjacent belt module, wherein the first leg portions are wider than the second leg portions such that a first cross-sectional area of the first leg portions is approximately equal to a second cross-sectional area of the second leg portions; and, placing a pivot rod through the openings in the second link ends of one of the plurality of belt modules and extending through the slots in the first link ends of an adjacent belt module such that the first and second link ends of the adjacent belt modules are intercalated and the adjacent belt modules are interlinked into adjacent hinged rows capable of following a curved path to form an endless belt capable of articulating about a drive sprocket.

* * * * *

UNITED STATES PATENT AND TRADEMARK OFFICE
CERTIFICATE OF CORRECTION

PATENT NO. : 6,357,581 B1
DATED : March 19, 2002
INVENTOR(S) : Guldenfels

It is certified that error appears in the above-identified patent and that said Letters Patent is hereby corrected as shown below:

Column 4,
Line 52, "though the thickness" should read -- through the thickness --

Column 6,
Line 1, "though the thickness" should read -- through the thickness --

Signed and Sealed this

Twenty-fifth Day of June, 2002

Attest:

JAMES E. ROGAN
Attesting Officer        Director of the United States Patent and Trademark Office